INVENTOR.
ROBERT D. BERRY
BY
ROY MILLER
ATTORNEY.

United States Patent Office 3,507,116
Patented Apr. 21, 1970

3,507,116
FLUERIC VARIABLE THRUST INJECTOR
Robert D. Berry, China Lake, Calif., assignor to the United States of America as represented by the Secretary of the Navy
Filed May 29, 1968, Ser. No. 732,981
Int. Cl. F02k 9/02; F15c 1/14
U.S. Cl. 60—39.74         2 Claims

ABSTRACT OF THE DISCLOSURE

A flueric valve to control the flow of fuel and oxidizer to an injector orifice comprising means for injecting gas into liquid propellants just behind the injector face at an orifice to create a vortex to throttle the propellants.

Background of the invention

Hydraulic and fluid control systems which are widely employed for controlling machine tools, steam engines, rocket and airplane devices and in many other applications generally use mechanical devices sucs as valves, diaphragms and vanes to control the liquid stream.

Variable thrust rocket engines are not feasible for many tactical weapons systems applications because of the bulk and complexity of necessary conventional hardware such as a hydraulic power supply, oil reservoir, servo valves or actuators.

It is well known to employ perpendicularly interacting and deflecting fluid streams, one of which constitutes a supply signal stream which exists between a supply orifice and one or more collector orifices. The other constitutes a control signal stream which acts on the side of the supply stream to determine the alignment of the main stream with the collector orifice. Such devices operate on the principle of deflecting the supply output stream at the point of interception with the control stream for varying the collection of the main stream.

In one such flueric system, a main power stream or jet is directed between an emitter orifice and a collector orifice. A control stream or jet is directed perpendicular to the main power stream. The high strength supply jet or stream can be directly controlled with a control stream of lower strength. Thus, the device constitutes a flueric amplifier.

In a typical vortex type flueric amplifier, the output exits at right angles to the input. The output pressure, and thus output velocity is reduced and this is undesirable for certain rocket motor applications.

Summary of the invention

In accordance with the present invention, an inert control gas jets tangentially into a vortex manifold causing a high rate of rotation of a liquid propellant and the control gas. The rotating fluids increase the back pressure at the supply inlets to the vortex manifold, thus throttling the liquid flow. The gas injection throttling has one distinct advantage over prior schemes in that liquid atomization and fuel velocity within the orifices are both improved as liquid flow rate is reduced. Injecting the control gas tangentially to the vortex chamber just upstream from the injector orifice causes uniform atomization and throttling.

Description of the preferred embodiment

Figure 1:
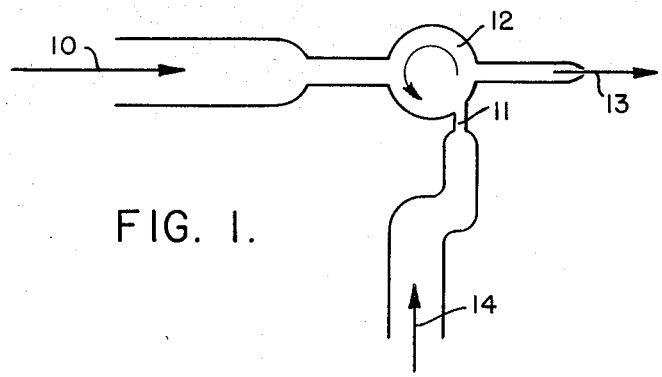
FIG. 1 is a diagrammatic view illustrating the principles of the present invention.

Referring to FIG. 1 liquid propellant stream 10 enters vortex chamber 12 and exits via outlet 13. An inert gas control stream 14, which may be nitrogen or argon, enters vortex chamber 12 just behind the injector face at orifice 11 to create a vortex which throttles the injector face at orifice 11 to create a vortex which throttles propellant stream 10. As the pressure of gas stream 14 increases, the propellant flow at outlet 13 will decrease proportionately. It should be noted that fluid output 13 exits in the same plane as fluid input 10.

Unlike prior art flueric devices, the existing propellant stream 13 retains a high velocity to permit atomization for good mixture with its complementary propellant. In prior art devices, as the controlling fluid increased in pressure to decrease the flow rate of the controlled fluid, the velocity of the controlled fluid decreased.

Figure 2:
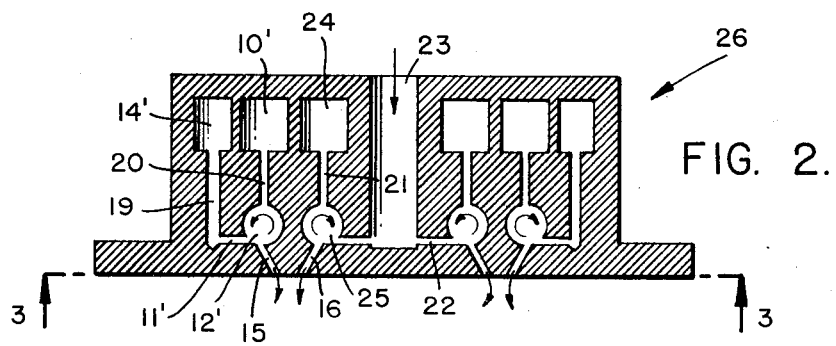
FIG. 2 is a cross sectional view of an injector disclosing the principles of the present invention.
Figure 3:
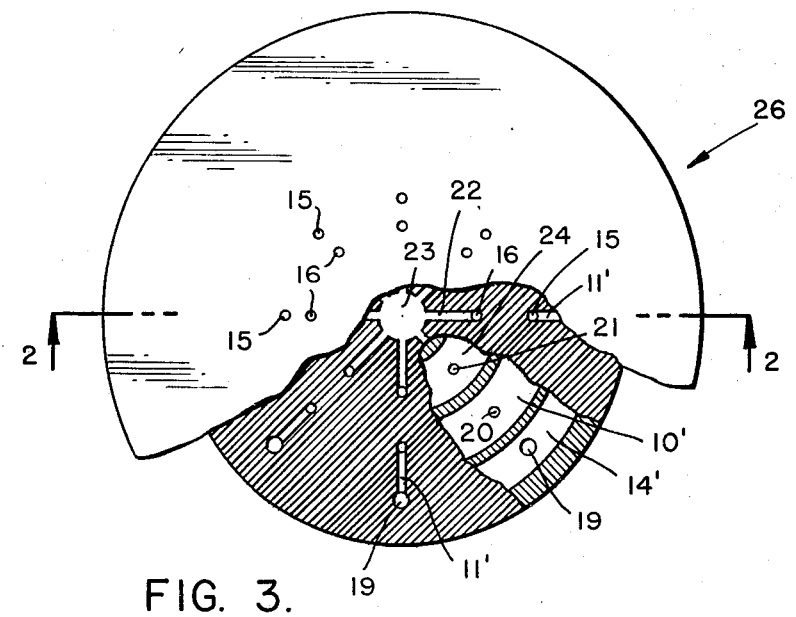
FIG. 3 is a bottom view of the injector shown in FIG. 2.

FIG. 2 and FIG. 3 disclose a rocket injector 26 embodying the principles of the subject invention. Inert gas stream 14', which may be nitrogen or argon, flows into vortex chamber 12' via passageway 11' thus curtailing the fuel flow 10' which exits via injector orifice 15. Similarly, inert gas flow 23 enters vortex chamber 25 via passageway 22 to control the flow of oxidizer 24 entering vortev chamber 25 via passageway 21. The controlled oxidizer flow exits via injector orifice 16 to combine with the fuel exiting from injector orifice 15.

The principles of the above described invention may be used to control the flow of a iquid, such as a fuel, or a gas, such as oxygen.

The invention described herein may be manufactured and used by or for the Government of the United States of America for governmental purposes without the payment of any royalties thereon or therefor.

What is claimed is:
1. A flueric valve to control fluid flow comprising:
a cylindrical chamber;
a first inlet for introducing a first fluid tangential to said chamber;
an outlet, located tangential to the chamber, and opposite from and in the same plane as the first inlet; and
a second inlet located adjacent to, substantially perpendicular to and in the same plane as the outlet for injecting a second fluid into said first fluid flow to create a vortex to throttle the first fluid.
2. A flueric variable thrust injector comprising:
a first flueric valve for controlling the flow rate of a liquid fuel comprising;
   a cylindrical chamber,
   a first inlet for introducing the liquid fuel tangential to said chamber,
   an outlet, located tangential to the chamber, and opposite from and in the same plane as the first inlet, and
   a second inlet located adjacent to, substantially perpendicular to and in the same plane as the outlet for injecting a control gas into said liquid fuel flow to create a vortex to throttle the fuel flow;
a second flueric valve for controlling the flow rate of an oxidizer comprising;
   a second cylindrical chamber,
   a third inlet for introducing the oxidizer tangential to said second chamber,
   a second outlet, located tangential to the second chamber, and opposite from and in the same plane as the third inlet, and
   a fourth inlet located adjacent to, substantially perpendicular to and in the same plane as the second outlet for injecting a contol gas into said oxidizer flow to create a vortex to throttle the flow of oxidizer, and means for mixing the fuel and oxidizer exiting from said first and second outlets at an injector orifice to provide rocket propulsion.

References Cited

UNITED STATES PATENTS

| | | | |
|---|---|---|---|
| 3,272,770 | 9/1966 | Lundahl | 60—39.74 |
| 3,282,280 | 11/1966 | Horton | 137—81.5 |
| 3,324,891 | 6/1967 | Rhoades | 137—81.5 |
| 3,366,370 | 1/1968 | Rupert | 60—39.28 |
| 3,417,772 | 12/1968 | Schaeffer | 60—258 |
| 3,426,534 | 2/1969 | Murphy | 60—240 |

MARK M. NEWMAN, Primary Examiner

D. HART, Assistant Examiner

U.S. Cl. X.R.

60—39.27, 240, 258; 137—81.5